United States Patent Office 2,982,532
Patented May 2, 1961

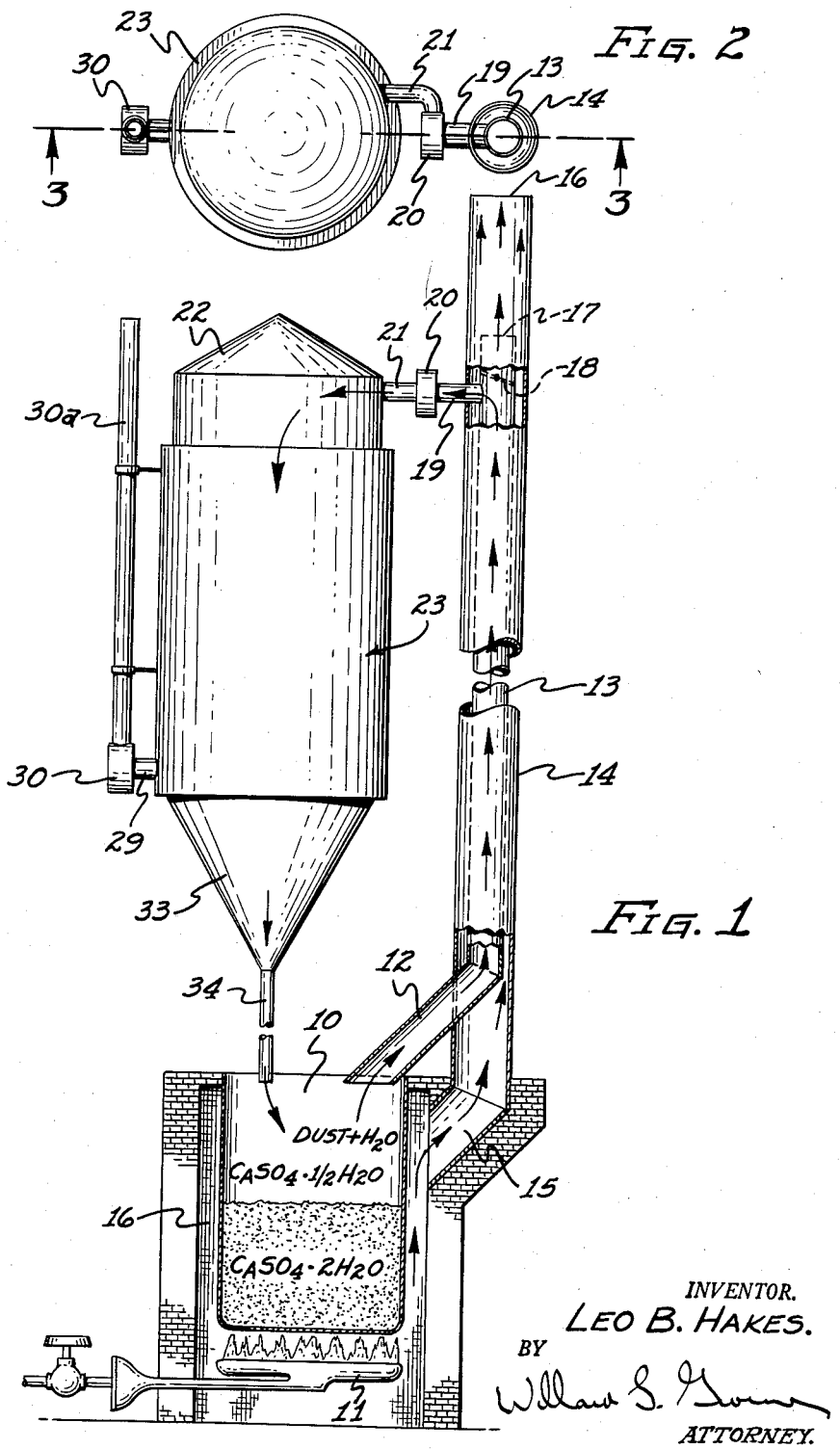

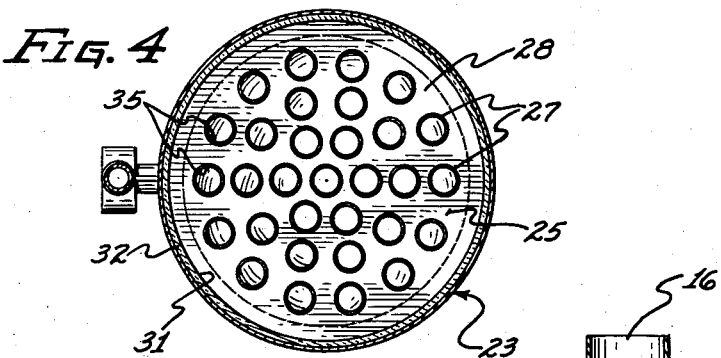
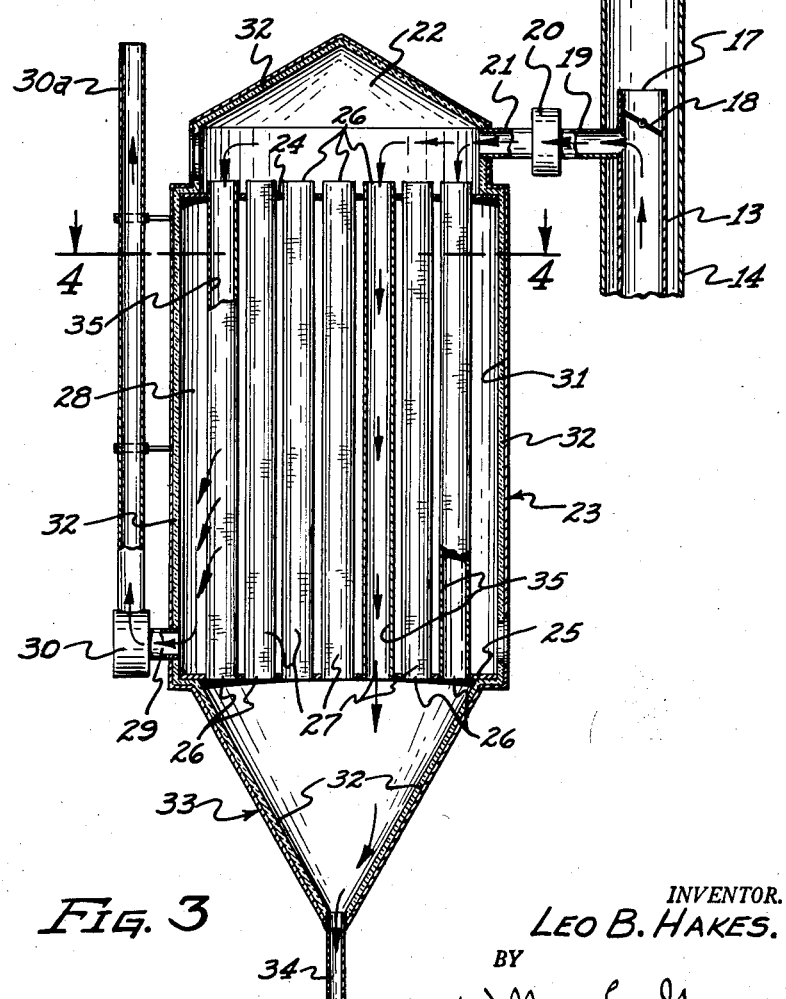

2,982,532
DUST COLLECTOR SYSTEM FOR GYPSUM KETTLE
Leo B. Hakes, Phoenix, Ariz., assignor to Union Gypsum Company, Phoenix, Ariz., a corporation of Arizona Filed May 18, 1959, Ser. No. 813,810
2 Claims. (Cl. 263—41)

This invention pertains to improvements in a dust collector system for gypsum kettles.

One of the objects of this invention is to provide a dust collecting system for gypsum kettles which is highly efficient in conserving heat energy and in preventing discharge of objectionable exhaust to atmosphere.

Another object is to provide dust collecting apparatus for a gypsum kettle having downdraft bag house so arranged as to prevent condensation and sticking of the dust to the bags when the circulation of air through the bags is stopped for dumping and discharge of the collected dust in the bags.

A further object of this invention is to provide a dust collecting system for a gypsum kettle wherein the dust separator is separate from the heat exchanger in the combustion gas discharge stack.

Further features and advantages of this invention will appear from a detailed description of the drawings in which:

Fig. 1 is a side elevation of a dust collecting system for a gypsum kettle incorporating the features of this invention.

Fig. 2 is a plan view of the apparatus shown in Fig. 1.

Fig. 3 is an enlarged view, partly in section of the line 3—3 of Fig. 2.

Fig. 4 is an enlarged sectional view on the line 4—4 of Fig. 3.

As an example of one embodiment of this invention there is shown a gypsum kettle 10 in which is placed the gypsum $CaSO_4 \cdot 2H_2O$ where it is heated by a suitable source such as the gas burner 11 to drive off the $H_2O$ and dust leaving the desired $CaSO_4 \cdot \frac{1}{2}H_2O$. The moisture and dust is discharged from the kettle through the discharge pipe 12 which is connected with the heat exchanger tube 13 mounted within the combustion gas stack 14 connected through passageway 15 to the combustion chamber 16 surrounding the kettle 10. The upper end 16 of the combustion gas stack 14 is open to atmosphere while the upper end 17 of the heat exchanger tube 13 is normally closed by a damper 18.

A suction pipe 19 is connected to the input of a blower 20 which discharges out through the pipe 21 into the plenum chamber 22 of the cylindrical bag house 23.

The bag house has an upper baffle 24 and a lower baffle 25 to which the open ends 26 of the vertically disposed bags 27 are secured. The suction chamber 28 surrounding the bags is connected to the outlet pipe 29 which in turn is connected to the suction intake of the blower 30 which in turn is connected to discharge up through the gas and vapor discharge stack 30a. The entire inside surface 31 of the bag house 23 is provided with insulation 32 to prevent undesirable condensation, collection of dust and corrosion of the bag house casing.

The lower portion of the bag house, below the baffle 25 supporting the open lower ends 26 of the bags 27, is provided with a collector cone 33, the converging bottom end of which is connected to the dry dust return line 34 discharging back into the kettle 10.

In the operation of this system, the combustion gases discharging through the passageway 15 and up through the combustion gas stack 14 is at approximately 625° F. and surrounds the heat exchange tube 13. The blower 20 is operating at a greater c.f.m. than the blower 30 with the dust and moisture being sucked through the heat exchanger tube 13. The blower 20 delivers this preheated material into the plenum chamber 22 at approximately 260° F. from where it passes down through the bags 27, around the outside of which a 1 to 2 inch W.G. Vacuum is maintained by the suction blower 30 to cause the dust to accumulate on the inside walls 35 of the bags 27, the filtered air and gases being discharged up the stack 30a at approximately 240° F. When the blowers are shut off the bags 27 collapse and the dust drops therefrom into the cone 33 at approximately 60° F. from which is returned to the kettle by the pipe 34. It will be noted that the operation of the blower 20 causes a continuous closed circuit of circulation through the plenum chamber 22, down through the inside of the bags 27, the cone 33, and the pipe 34 into the kettle 10, then up through the discharge pipe 12, and the heat exchanger tube 13 and pipe 19 back to the blower 20. The blower 30 maintains a suitable vacuum in the chamber 28 to maintain the bags 27 inflated when drawing off the dust free moisture ladened gases for discharge to atmosphere.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A dust collector system including a gypsum kettle, a combustion chamber surrounding said kettle, a source of heat for said kettle located in said combustion chamber, a discharge stack open to atmosphere connected to said combustion chamber adapted to receive the excess heat discharged from said combustion chamber, a discharge pipe connected into the top portion of said kettle adapted to receive the moisture ladened air and dust discharged from the gypsum being heated in said kettle, a heat exchanger interconnected between said discharge stack and said discharge pipe whereby heat from said combustion chamber is applied to increase the temperature of the discharged moisture ladened air and dust from said gypsum in said kettle, a recirculating blower having its suction connected through said heat exchanger to receive discharge from said discharge pipe, a baghouse connected to receive the discharge from said blower, a dust return line connected to the bottom of said baghouse and connected to discharge into the top of said kettle to return the air and collected dust to said kettle, and a vacuum blower having its suction connected to said baghouse discharging filtered air from said baghouse to atmosphere, said dust collector system be characterized by a closed circuit comprising said kettle, the heat exchanger, said recirculating blower and said baghouse serially interconnected as recited.

2. A dust collector system as set forth in claim 1 wherein said heat exchanger raises the temperature of the moisture ladened air in said closed circuit to maintain said air temperature above the dew point as it is circulated through said baghouse so as to prevent condensation in and clogging of the baghouse filter member.

References Cited in the file of this patent

UNITED STATES PATENTS

| | | |
|---|---|---|
| 1,508,367 | Matlock | Sept. 9, 1924 |
| 1,746,294 | Tyler | Feb. 11, 1930 |
| 1,770,020 | Taylor | July 8, 1930 |
| 1,840,857 | Testrup et al. | Jan. 21, 1932 |
| 2,776,132 | Pyzel | Jan. 1, 1957 |